United States Patent
Zhuo et al.

(10) Patent No.: US 11,106,382 B2
(45) Date of Patent: Aug. 31, 2021

(54) METHOD, DEVICE AND COMPUTER PROGRAM PRODUCT FOR STORAGE MANAGEMENT

(71) Applicant: EMC IP Holding Company LLC, Hopkinton, MA (US)

(72) Inventors: Baote Zhuo, Beijing (CN); Jian Gao, Beijing (CN); Xinlei Xu, Beijing (CN); Shaoqin Gong, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 16/806,721

(22) Filed: Mar. 2, 2020

(65) Prior Publication Data
US 2020/0341675 A1     Oct. 29, 2020

(30) Foreign Application Priority Data
Apr. 29, 2019   (CN) .......................... 201910355164.9

(51) Int. Cl.
*G06F 3/06*   (2006.01)
(52) U.S. Cl.
CPC .......... *G06F 3/0647* (2013.01); *G06F 3/0604* (2013.01); *G06F 3/0689* (2013.01)
(58) Field of Classification Search
CPC ..... G06F 3/0647; G06F 3/0604; G06F 3/0689
See application file for complete search history.

(56) References Cited

U.S. PATENT DOCUMENTS

| | | | | |
|---|---|---|---|---|
| 7,111,147 B1* | 9/2006 | Strange | ................. | G06F 3/0607 711/114 |
| 9,672,905 B1* | 6/2017 | Gold | ................... | G11C 11/5628 |
| 10,146,624 B1* | 12/2018 | Gong | ................... | G06F 11/142 |
| 2005/0262038 A1* | 11/2005 | Sepez | ................... | G06F 3/0658 |
| 2007/0118689 A1* | 5/2007 | Hyde, II | ............... | G06F 3/0607 711/114 |
| 2014/0317346 A1* | 10/2014 | Moon | ................... | G06F 3/0665 711/114 |
| 2019/0155535 A1* | 5/2019 | Han | ...................... | G06F 3/0632 |

* cited by examiner

*Primary Examiner* — Ryan Bertram
(74) *Attorney, Agent, or Firm* — BainwoodHuang (57) ABSTRACT

Storage management techniques involve determining a set of association degrees associated with a set of storage disks, the set of storage disks forming a set of Redundant Arrays of Independent Disks (RAIDs), and an association degree of the set of association degrees indicating a coupling degree of a pair of storage disks in the set of storage disks, the coupling degree being determined based on a number of RAIDs associated with the pair of storage disks. Such techniques further involve determining a first number of pairs of storage disks, wherein the coupling degree of each pair of storage disks is less than a predetermined coupling threshold; and in response to determining that a ratio of the first number to a total number of pairs of storage disks of the set of storage disks is greater than a predetermined ratio threshold, reorganizing at least one RAID in the set of RAIDs.

18 Claims, 4 Drawing Sheets

METHOD, DEVICE AND COMPUTER PROGRAM PRODUCT FOR STORAGE MANAGEMENT

CROSS REFERENCE TO RELATED APPLICATION

This application claims priority to Chinese Patent Application No. CN201910355164.9, on file at the China National Intellectual Property Administration (CNIPA), having a filing date of Apr. 29, 2019, and having "METHOD, DEVICE AND COMPUTER PROGRAM PRODUCT FOR STORAGE MANAGEMENT" as a title, the contents and teachings of which are herein incorporated by reference in their entirety.

FIELD

Embodiments of the present disclosure generally relate to the field of computers, and more specifically, to a method, a device and a computer program product for storage management.

BACKGROUND

In a Redundant Arrays of Independent Disks (RAID) based storage system, if one of the storage disks fails, the storage system can utilize data from other storage disks to recover data in the failed disk. However, multiple storage disks might fail simultaneously, and such failures cannot be well recovered due to the loss of some of data. Therefore, how to reduce the risk of storage disk failure has become a current focus.

SUMMARY

Embodiments of the present disclosure provide a scheme for management solution.

In accordance with the first aspect of the present disclosure, there is provided a method for storage management. The method includes: determining a set of association degrees associated with a set of storage disks, the set of storage disks forming a set of Redundant Arrays of Independent Disks (RAIDs), and an association degree of the set of association degrees indicating a coupling degree of a pair of storage disks in the set of storage disks, the coupling degree being determined based on a number of RAIDs associated with the pair of storage disks; determining a first number of pairs of storage disks, wherein the coupling degree of each pair of storage disks is less than a predetermined coupling threshold; and in response to determining that a ratio of the first number to a total number of pairs of storage disks of the set of storage disks is greater than a predetermined ratio threshold, reorganizing at least one RAID in the set of RAIDs.

In accordance with the second aspect of the present disclosure, there is provided a device for storage management. The device includes: at least one processing unit; and at least one memory being coupled to the at least one processing unit and storing instructions for execution by the at least one processing unit, the instructions, when executed by the at least one processing unit, causing the device to perform acts including: determining a set of association degrees associated with a set of storage disks, the set of storage disks forming a set of Redundant Arrays of Independent Disks (RAIDs), and an association degree of the set of association degrees indicating a coupling degree of a pair of storage disks in the set of storage disks, the coupling degree being determined based on a number of RAIDs associated with the pair of storage disks; determining a first number of pairs of storage disks, wherein the coupling degree of each pair of storage disks is less than a predetermined coupling threshold; and in response to determining that a ratio of the first number to a total number of pairs of storage disks of the set of storage disks is greater than a predetermined ratio threshold, reorganizing at least one RAID in the set of RAIDs.

In accordance with the third aspect of the present disclosure, there is provided a computer program product stored in a non-transitory computer storage medium and including machine-executable instructions which, when executed by a device, cause the device to perform an action according to any steps of method in the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others may denote different or identical objects. The following text may also contain other explicit or implicit definitions.

In a RAID-based storage system, one RAID can include a plurality of storage blocks from multiple storage disks, and multiple storage disks can also constitute multiple independent RAIDs. In a RAID-based data recovery process, other storage blocks in a same RAID can be utilized to recover data of a target storage block. In order to minimize the risk of storage disk failure, RAID-based storage systems always expect that storage blocks in multiple RAIDs to be evenly distributed to each storage disk, so that the impact of a storage disk failure would be lowered as much as possible. However, when the storage system performs a garbage collection operation or when a new storage disk is added to the storage system, the distribution of storage blocks of the plurality of RAIDs in the storage system may become uneven. In order to better understand the process of storage management according to an embodiment of the present disclosure, the basic architecture of a RAID-based storage system will first be described below.

Figure 1:
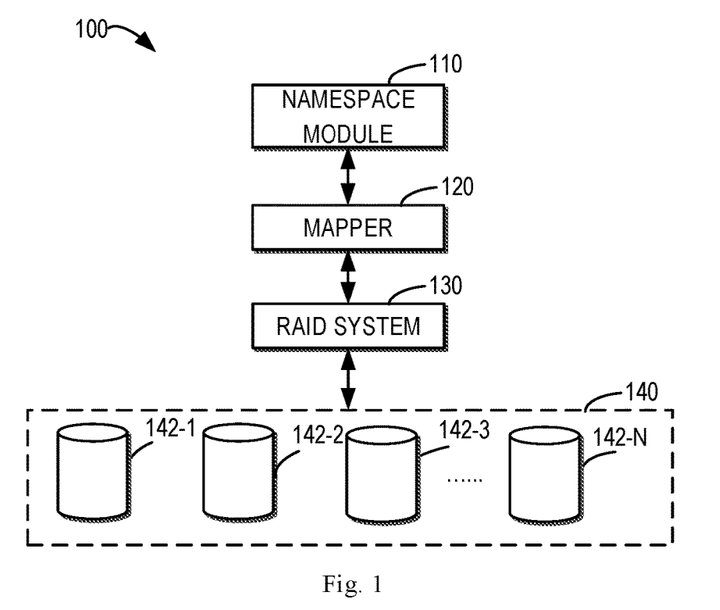
FIG. 1 is a diagram illustrating an example storage system in which embodiments in the present disclosure may be implemented.

FIG. 1 is a diagram illustrating an example storage system 100 in which embodiments in the present disclosure may be implemented. As shown in FIG. 1, the storage system 100 includes a hardware storage pool 140, which includes a plurality of storage disks 142-1, 142-2, 142-3, . . . , 142-N (N is an integer greater than or equal to 1) for providing physical storage space for the storage system 100. For ease of discussion, these storage disks are sometimes collectively referred to or individually referred to as a storage disk 142. The storage disk 142 may include various types of devices with storage functions, including but not limited to a hard disk (HDD), a solid state disk (SSD), a removable disk, a compact disk (CD), a laser disk, an optical disk, and a digital video disk (DVD), floppy, blue-ray Disc, serial attached small computer system interface (SCSI) storage disk (SAS), serial advanced technology attachment (SATA) storage disk, any other magnetic storage device, and any other optical storage equipment, or any combination thereof.

A RAID system 130 in the storage system 100 is built based on a plurality of storage disks 142, which organizes the physical storage space of the storage disks 142 using a RAID algorithm. RAID system 130 provides a flat physical address space to a mapper 120 of storage system 100. The mapper 120 is configured to manage a mapping between physical addresses and logical addresses of the storage system 100. The mapper 120 provides a flat linear logical address space to a namespace module 110. The namespace module 110 utilizes the logical address space provided by the mapper and can invoke an application program interface (API) of the mapper 120 to obtain a mapping from the logical address to the physical address. When an I/O operation is performed on the storage system 100, an I/O request from the user is received by the namespace module 110 and sent to the mapper 120. The mapper 120 looks up the physical address (address where data is to be written or address where data is to be read) of data to which the I/O request is directed and sends the I/O to the RAID system 130 for actual I/O operations by the RAID system 130 in the backend storage disk.

It should be understood that FIG. 1 only schematically illustrates elements, modules or components in storage system 100 that are related to embodiments of the present disclosure. The various components shown in FIG. 1 are merely example storage system management architecture. In other RAID-based storage systems, there may be other architectural partitioning schemes, and other units, modules or components and the like for other functions. Thus, embodiments of the present disclosure are not limited to the specific devices, units, modules or components described in FIG. 1, but are generally applicable to any RAID technology based storage system.

Figure 2:
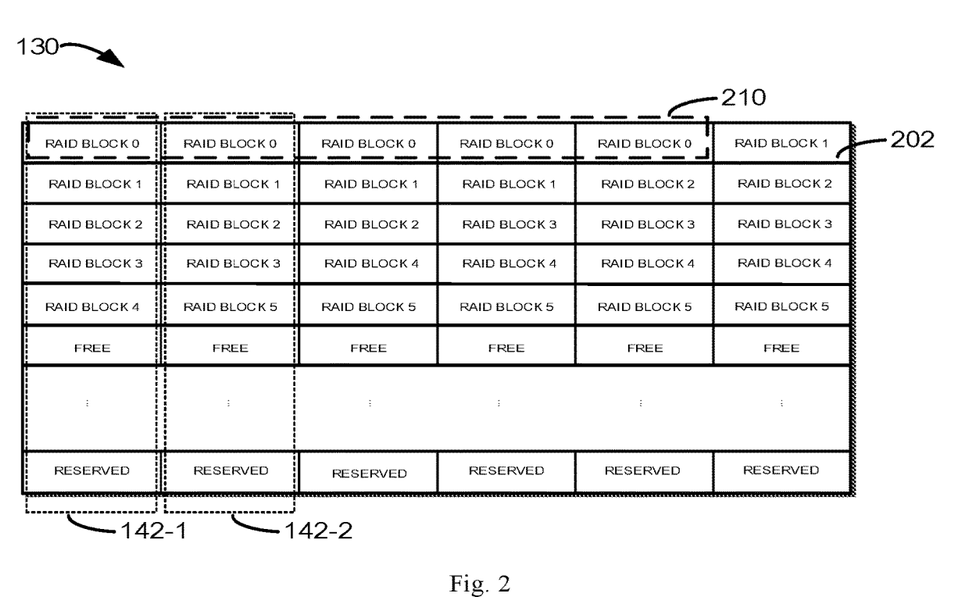
FIG. 2 shows a diagram illustrating a plurality of memory blocks from a plurality of storage disks constituting a RAID according to an embodiment of the present disclosure.

In RAID-based storage systems, various RAID algorithms can be utilized to organize the physical storage disk 142, including conventional RAID algorithms and architectures currently referred to as RAID 2.0. To better understand the RAID based storage system, FIG. 2 shows an example structure of a RAID system 130. As shown in FIG. 2, the storage disk 142 is divided into a plurality of disk extents or a plurality of disk slices 202. Such division can be a logical division. The size of an extent 202 depends on the size of the storage disk and partitioning scheme. In some examples, the size of the disk extent 202 can be at a magnitude of a gigabyte. Of course, other sizes are also possible depending on the actual deployment needs.

The RAID system 130 is constructed in units of disk extent 202. In some dynamically allocated storage systems, when the RAID system 130 is initially created, all extents are free. When the capacity of the RAID is found to be insufficient with the writing of data, the RAID system 130 will select a plurality of disk extents 202 from different storage disks 142 with a certain algorithm and organize the disk extent 202 into RAID blocks 210 of the RAID system 130. Such a RAID block 210 can be considered a small RAID because the I/O access and management of the RAID block 210 is similar to a conventional RAID.

The disk extent 202 may be selected from a plurality of storage disks 142 through any suitable algorithms, such as a Round-Robin algorithm, a weighted Round-Robin algorithm, and the like. The number of disk extents included in each RAID 210 depends on the type of RAID, which would provide data redundancy and resiliency of different levels. The types of RAID include RAID 2, RAID 3, RAID 4, RAID 5, RAID 6, RAID 7, and RAID 10 and so on. In FIG. 2 and below, for the purpose of illustration, embodiments of the present disclosure are discussed taking the RAID 5 type as an example. However, it should be understood that example embodiments of the present disclosure may be similarly applied to any other types of RAIDS.

In FIG. 2, each RAID block 210 includes five disk extents from different storage disks 142 depending on the type of RAID 5. As mentioned above, new RAID blocks 210 can be continuously allocated according to the needs of data writing, so that the capacity of the RAID system 130 is dynamically increased. Five RAID blocks 210 (i.e., RAID block 0 to RAID block 5) that have been allocated are shown in FIG. 2. In each block extent 202 in FIG. 2, "RAID Block 0", "RAID Block 1", "RAID Block 2", "RAID Block 3", "RAID Block 4", or "RAID Block 5" are used to mark that the disk extent is allocated to corresponding RAID blocks. The disk extent 202 of each of the storage disks 142 not being selected as a RAID block is considered to be the spare disk extent 202 and is marked as "spare".

In some embodiments, one or more disk extent 202 (marked as "reserved") in each storage disk 142 may also be reserved for data reconstruction in the event of a disk failure. For example, if a storage disk 142 fails, the disk extents 202 of the storage disk 142 are all marked as failed, which means that the RAID blocks 210 constructed based on these disk extents 202 are also affected. The storage system 100 can initiate a rebuild process, replace the disk extent marked as failed in the RAID block 210 with reserved disk extent 202, and reconstruct, in the reserved disk extent 202, the data/information in the disk extent marked as failed. According to the reconstruction algorithm, the reconstruction process may be initiated for a period of time after the disk failure. Embodiments of the present disclosure are not limited in this regard.

As discussed above, storage blocks in a RAID composed of a plurality of storage disks may be distributed unevenly in a plurality of storage disks due to a garbage collection operation by the storage system or the addition of a new storage disk to the storage system or the like, and such unevenness will increase the risk of storage disk failure.

According to an embodiment of the present disclosure, it provides a solution of storage management. In the solution, a set of association degrees associated with a set of storage disks is first determined, wherein the set of storage disks form a set of Redundant Array of Independent Disks (RAIDs), and wherein an association degree of a set of association degrees indicates a coupling degree of a pair of a storage disks in a set of storage disks and the coupling degree is determined based on the number of RAIDs associated with the pair of storage disks. The set of association degrees may be further used to determine a first number of pairs of storage disks, wherein the coupling degree of each pair of storage disks is less than a predetermined coupling threshold, and in response to determining that a ratio of the first number to a total number of pairs of storage disks of the set of storage disks is greater than a predetermined ratio threshold, reorganize at least one RAID in a set of RAIDs. In this manner, embodiments of the present disclosure can determine whether the distribution of a set of RAIDs in the set of storage disks is even based on the coupling degree between each other in a set of storage disks. Embodiments of the present disclosure are also capable of adjusting at least one RAID upon a determination of an uneven distribution to make the distribution more even, thereby improving the stability of the storage system.

Figure 3:
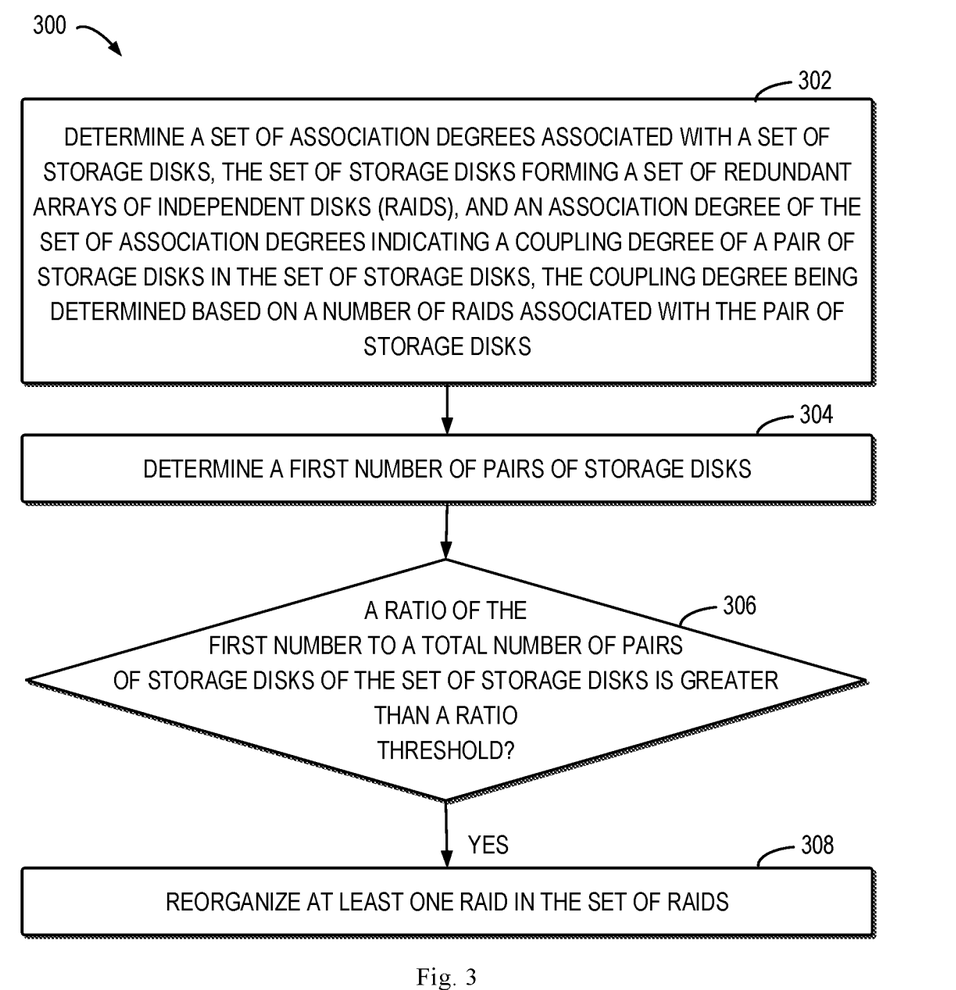
FIG. 3 shows a flow chart illustrating a process of storage management in accordance with an embodiment of the present disclosure.

A process of storage management according to an embodiment of the present disclosure will be described below with reference to FIG. 3 to FIG. 4. FIG. 3 illustrates a flow diagram of a process 300 for storage management in accordance with some embodiments of the present disclosure. Process 300 can be implemented, for example, by the storage system 100 shown in FIG. 1.

At block 302, the storage system 100 determines a set of association degrees associated with a set of storage disks 142, wherein the set of storage disks 142 form a set of RAIDs, and an association degree of the set of association degrees indicates a coupling degree of a pair of storage disks in the set of storage disks, wherein the coupling degree is determined based on number of RAIDs associated with the pair of storage disks. Taking FIG. 2 as an example, a set of storage disks forms a set of RAIDs including RAID block 0, RAID block 1, RAID block 2, RAID 3, RAID 4, and RAID block 5. The storage system 100 can further determine a coupling degree between any two storage disks of a set of storage disks 142 based on number of RAIDs associated with the pair of storage disks simultaneously. For example, taking the storage disk 142-1 and the storage disk 142-2 in FIG. 2 as an example, the coupling degree between them can be determined as the number of RAIDs associated with both of the pair of the storage disks, that is, the number RAIDs (RAID block 0, RAID block 1, RAID block 2, and RAID block 3) including storage blocks of both of the pair of storage disks (i.e., 4).

Similarly, the storage system 100 can determine a coupling degree for each pair of storage disks of a set of storage disks 142 so as to obtain a coupling matrix (also referred to as a neighborhood matrix). For example, Table 1 gives an example coupling matrix determined by storage system 100 in which a coupling degree between the storage disk and itself is set to zero.

TABLE 1

|        | disk 0 | disk 1 | disk 2 | disk 3 | disk 4 | disk 5 | disk 6 |
|--------|--------|--------|--------|--------|--------|--------|--------|
| disk 0 | 0      | 35     | 36     | 35     | 35     | 35     | 34     |
| disk 1 | 35     | 0      | 35     | 35     | 35     | 35     | 35     |
| disk 2 | 36     | 35     | 0      | 35     | 35     | 35     | 34     |
| disk 3 | 35     | 35     | 35     | 0      | 35     | 35     | 34     |
| disk 4 | 35     | 35     | 35     | 35     | 0      | 35     | 34     |
| disk 5 | 35     | 35     | 35     | 35     | 35     | 0      | 37     |
| disk 6 | 34     | 35     | 34     | 34     | 34     | 37     | 0      |

As shown in the example coupling matrix of Table 1, each item in the table represents a coupling degree between a pair of storage disks. For example, the coupling degree between the storage disk 0 and the storage disk 1 is 35, and the coupling degree between the storage disk 0 and the storage disk 2 is 36.

At block 304, the storage system 100 determines the number of pairs of storage disks, wherein the coupling degree of each pair of storage disks is less than a predetermined coupling threshold (hereinafter referred to as the first number for purpose of description). In some embodiments, the storage system may determine whether a set of RAIDs is evenly distributed among a set of storage disks based on Chebyshev's inequality, wherein the base Chebyshev's inequality is as shown in equation (1):

$$Pr(|X - \mu| \geq k\sigma) \leq \frac{1}{k^2} \quad (1)$$

In the equation, X represents a variable to be determined, $\mu$ is the expectation, $\sigma$ is the standard deviation of the set of variables, and k is a coefficient larger than 0. A variant of the Chebyshev's inequality will be utilized below to determine if a set of RAIDs are evenly distributed among a set of storage disks. Specifically, a process of determining the first number according to an embodiment of the present disclosure will be described below with reference to FIG. 4.

Figure 4:
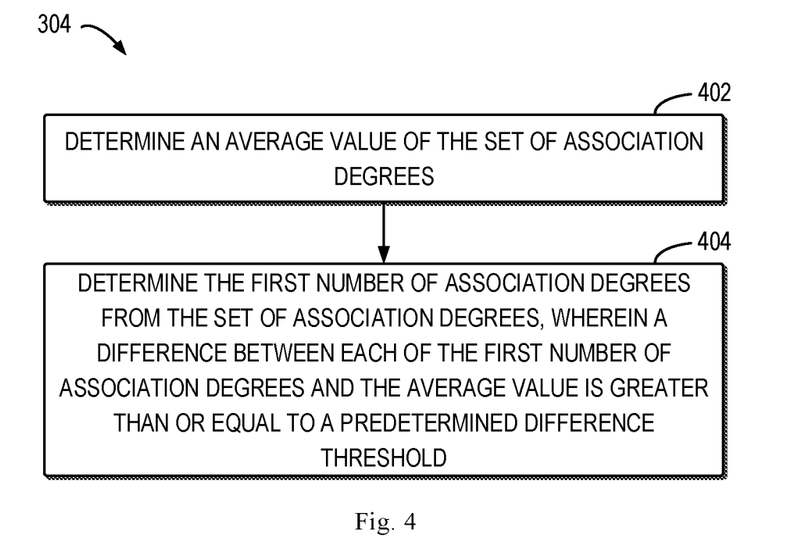
FIG. 4 shows a flow chart illustrating a process of determining a first number in accordance with an embodiment of the present disclosure.

As shown in FIG. 4, at block 402, the storage system 100 can determine an average value of the set of association degrees. Taking the coupling matrix shown in Table 1 as an example, the storage system can determine that the average value of the association degree of the set is 34.95238.

At block 404, the storage system 100 determines the first number of association degrees from the set of association degrees, wherein a difference of each of the first number of association degrees and the average value is greater than or equal to a predetermined difference threshold. In some embodiments, based on the Chebyshev's inequality, the difference threshold may be determined based on a standard deviation of the set of association degrees. That is, the storage system 100 may determine the first number as the number of association degrees which satisfies with the equation (2):

$$|X-\mu| \geq k\sigma \quad (2)$$

Specifically, in the example of Table 1, $\mu$ is equal to the average value of 34.95238, and the standard deviation $\sigma$ is 0.679636, and k is a parameter that can be set to be greater than zero. In some embodiments, the equation works better when k is taken to be 3/2 according to experiments. In the case where k is set to be 3/2, the storage system 100 can determine that the first number in the example of Table 1 is 2.

Continuing to reference to FIG. 3, at block 306, the storage system 100 determines whether a ratio of the first number to a total number of pairs of storage disks of a set of storage disks is greater than a predetermined ratio threshold. Specifically, in the example of Table 1, a set of storage disks includes 7 storage disks, so the total number of storage disk pairs is 7*6/2=21 pairs. The storage system can further calculate a ratio of the first number to the total number of pairs of storage disks is 6/21. In some embodiments, the storage system 100 can utilize a conventional Chebyshev's inequality to determine whether RAID is distributed evenly, i.e., the storage system can determine if equation (3) is true:

$$Pr(|X-\mu| \geq 3/2\sigma) > 44.44\% \quad (3)$$

Specifically, as described above, the storage system 100 can determine $Pr(|X-\mu| \geq 3/2\sigma)=2/21$, when it is less than 44.44%, that is the equation (3) is false. That is, in this case, the storage system 100 can determine that the distribution of the set of RAIDs in the set of storage disks is evenly distributed without a need of adjustment.

In some embodiments, the storage system 100 can utilize an enhanced Chebyshev's inequality to determine whether the set of RAIDs is distributed evenly. Specifically, the storage system can utilize the variant equation (4) as a criterion for judgment:

$$Pr(|X-\mu| \geq 3/2\sigma) > \alpha \quad (4)$$

It can be seen that, unlike the conventional Chebyshev's inequality, according to experimental observation, the accuracy of the determination can be improved when the threshold value of 44.44% associated with the parameter k is modified to a smaller threshold value $\alpha$. For example, according to experimental observation, when a is set to 20%, the storage system 100 can obtain a better result. Continuing with the example of Table 1, the storage system 100 can determine that 2/21 is less than 20%, i.e., the equation (4) is false, so the storage system 100 can determine that the set of RAIDs is distributed evenly without a need of adjustment.

Table 2 gives another example coupling matrix (neighborhood matrix) according to an embodiment of the present disclosure. For example, Table 1 may be an example coupling matrix when initially building a plurality of RAIDs, and Table 2 may be, for example, an example coupling matrix after garbage collection and so on.

TABLE 2

|        | disk 0 | disk 1 | disk 2 | disk 3 | disk 4 | disk 5 | disk 6 |
|--------|--------|--------|--------|--------|--------|--------|--------|
| disk 0 | 0      | 34     | 35     | 33     | 35     | 33     | 32     |
| disk 1 | 34     | 0      | 34     | 33     | 34     | 33     | 34     |
| disk 2 | 35     | 34     | 0      | 33     | 34     | 33     | 33     |
| disk 3 | 33     | 33     | 33     | 0      | 34     | 32     | 32     |
| disk 4 | 35     | 34     | 34     | 34     | 0      | 34     | 34     |
| disk 5 | 33     | 33     | 33     | 32     | 34     | 0      | 35     |
| disk 6 | 32     | 34     | 33     | 32     | 34     | 35     | 0      |

Based on the above process, the storage system 100 can determine that $\mu$ is equal to the average value 33.52381 in the example of Table 2, and the standard deviation $\sigma$ is 0.928388, and the first number can be determined to be 6 according to equation (2), thereby determining that the ratio is $Pr(|X-\mu| \geq 3/2\sigma)=6/21$. The storage system 100 may further determine that the example of Table 2 satisfies the equation (4), so the storage system 100 may determine that the ratio of the first number to the total number of pairs of storage disks in a set of storage disks is greater than a predetermined ratio threshold, that is, the set of RAIDs are distributed evenly in the set of storage disks and need adjustment.

Referencing back to FIG. 3, in response to determining at block 306 that the ratio of the first number to the total number of pairs of storage disks in a set of storage disks is greater than a predetermined ratio threshold, then the method 300 proceeds to block 308 where the storage system 100 reorganizes at least one RAID in the set of RAIDs. It should be understood that the storage system 100 may not adjust the set of RAIDs (not shown) when it is determined at block 306 that the ratio of the first number to the total number of pairs of storage disks in a set of storage disks is less than or equal to a predetermined ratio threshold.

For example, in the example of Table 1, the storage system 100 can determine that the RAID distribution at this time is relatively even with no need of distribution adjustment. When Table 1 is updated to Table 2 after operations such as garbage collection, the storage system 100 can determine that the RAID distribution at this time is relatively uneven and it is necessary to adjust the distribution of the RAID.

In some embodiments, the storage system 100 can move data associated with a source storage block in at least one RAID into a target storage block, wherein the first storage disk corresponding to the source storage block is different from the second storage disk corresponding to target storage block. For example, in the example of Table 2, the storage disk 0 and the storage disk 6 have a lower coupling degree (32), and the storage disk 0 and the storage disk 2 have a higher coupling degree (35), so the storage system 100 can move the data stored in the storage block in the storage disk 2 in the RAIDs associated with the storage disk 0 and the storage disk 2 to the storage disk 6. After the movement, the coupling degree between the storage disk 0 and the storage disk 6 will be updated to 33, and the coupling degree between the storage disk 0 and the storage disk 2 will be updated to 34, i.e., the distribution of RAID in the storage system is more even. In some embodiments, the sum of at least one association degree associated with the first storage disk is greater than a predetermined first threshold, and the sum of at least one association degree associated with the second storage disk is less than a predetermined second threshold. It should be understood that the first threshold and the second threshold may be adaptively adjusted according to a particular storage system. In this manner, the storage system 100 can move data from a storage disk with a higher coupling degree to other storage disks to a storage disk with a lower coupling degree to other storage disks, thereby enabling the distribution of the RAID in the set of storage disks to be more even. It should be understood that any suitable reorganization technique can be employed to adjust the set of RAIDs to make the distribution of the set of RAIDs more even.

In the manner discussed above, the embodiment of the present disclosure can more accurately determine whether the distribution of a set of RAIDs in a set of storage disks is even, and adjust at least one RAID when the distribution is uneven, so that the distribution of RAID becomes more even. This further improves the storage stability of the set of RAID and effectively reduces the risk of storage disk failure.

Figure 5:
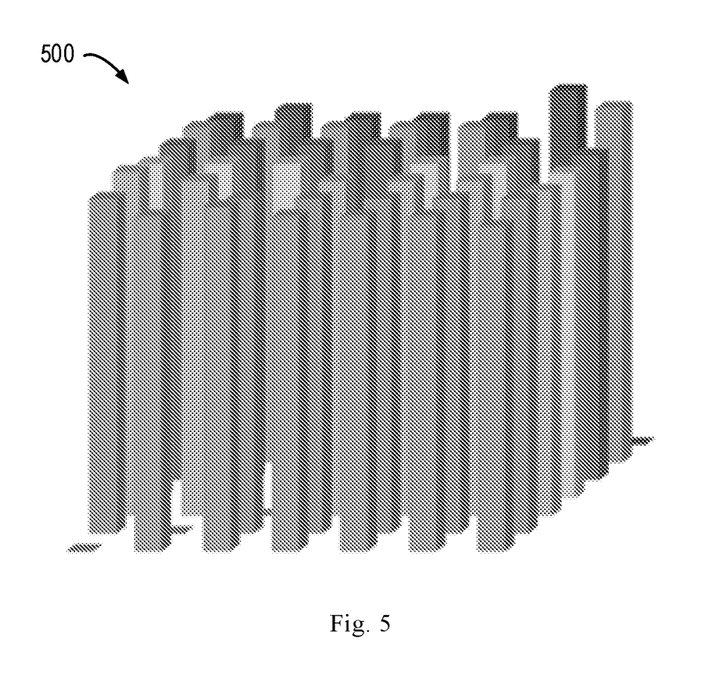
FIG. 5 shows a an example graphical representation in accordance with an embodiment of the present disclosure.

In some embodiments, the storage system 100 can also provide a graphical representation of the set of association degrees. For example, the storage system can also provide a reorganization association in the form of a matrix as shown in Table 1 or Table 2, so that the administrator can intuitively understand whether the distribution is even. Alternatively, the storage system 100 can also graphically show the degree of distribution equalization of the set of RAIDs by way of a graph. For example, FIG. 5 illustrates an example graphical representation 500 in accordance with an embodiment of the present disclosure and the graphical representation 500 corresponds to the coupling matrix shown in Table 2, enabling administrators to more intuitively understand which disks are unevenly distributed.

Figure 6:
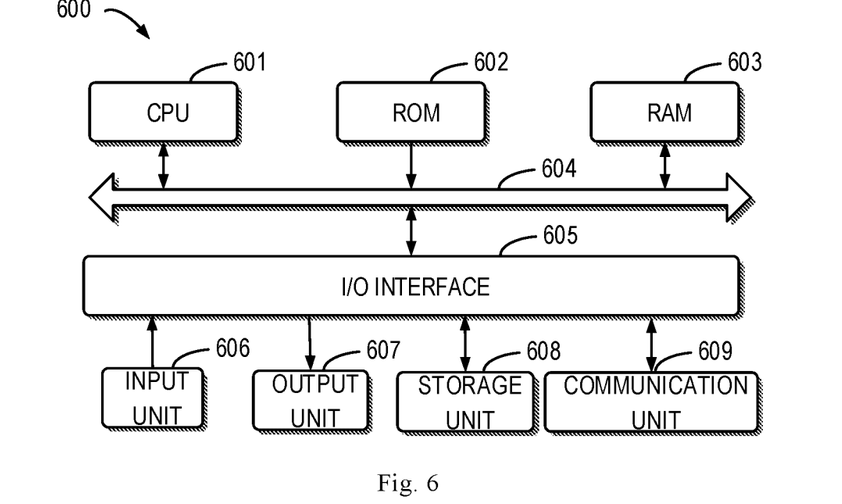
FIG. 6 shows a block diagram illustrating an example device that can be used to implement embodiments of the present disclosure.

FIG. 6 shows a schematic block diagram of an example device 600 that can be used to implement embodiments of the present disclosure. For example, the storage system 100 according to embodiments of the present disclosure can be implemented by device 600. As shown, device 600 includes a central processing unit (CPU) 601 that can perform various appropriate actions according to computer program instructions stored in read only memory (ROM) 602 or loaded from storage unit 608 into a random access memory (RAM) 603. In the RAM 603, various programs and data required for the operation of the device 600 can also be stored. The CPU 601, the ROM 602, and the RAM 603 are connected to each other through a bus 604. An input/output (I/O) interface 605 is also coupled to bus 604.

A plurality of components in device 600 are coupled to I/O interface 605, including: input unit 606, such as a keyboard, mouse, etc.; output unit 607, such as various types of displays, speakers, etc.; storage unit 608, such as a disk and an optical unit, etc.; and a communication unit 609 such as a network card, a modem, a wireless communication transceiver, and the like. Communication unit 609 allows device 600 to exchange information/data with other devices over a computer network such as the Internet and/or various telecommunication networks.

The various processes and processes described above, such as method 300, may be performed by processing unit 601. For example, in some embodiments, method 300 can be implemented as a computer software program that is tangibly embodied in a machine readable medium, such as storage unit 608. In some embodiments, some or the entire computer program may be loaded and/or installed onto device 600 via ROM 602 and/or communication unit 609. One or more actions of method 300 described above may be performed when a computer program is loaded into RAM 603 and executed by CPU 601.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

We claim:

1. A method for storage management, comprising:
   determining a set of association degrees associated with a set of storage disks, the set of storage disks forming a set of Redundant Arrays of Independent Disks (RAIDs), and an association degree of the set of association degrees indicating a coupling degree of a pair of storage disks in the set of storage disks, the coupling degree being determined based on a number of RAIDs associated with the pair of storage disks;
   determining a first number of pairs of storage disks, wherein the coupling degree of each pair of storage disks is less than a predetermined coupling threshold; and
   in response to determining that a ratio of the first number to a total number of pairs of storage disks of the set of storage disks is greater than a predetermined ratio threshold, reorganizing at least one RAID in the set of RAIDs.

2. The method according to claim 1, wherein determining the first number comprises:
   determining an average value of the set of association degrees; and
   determining the first number of association degrees from the set of association degrees, wherein a difference between each of the first number of association degrees and the average value is greater than or equal to a predetermined difference threshold.

3. The method according to claim 2, wherein the difference threshold is determined based on a standard deviation of the set of association degrees.

4. The method according to claim 1, wherein the reorganizing comprises:
   moving data associated with a source storage block in the at least one RAID into a target storage block, a first storage disk corresponding to the source storage block being different from a second storage disk corresponding to the target storage block.

5. The method according to claim 4, wherein a sum of at least one association degree associated with the first storage disk is greater than a first predetermined threshold, and wherein a sum of at least one association degree associated with the second storage disk is less than a second predetermined threshold.

6. The method according to claim 1, further comprising:
   providing a graphical representation of the set of association degrees.

7. A device for storage management, comprising:
   at least one processing unit; and
   at least one memory being coupled to the at least one processing unit and storing instructions for execution by the at least one processing unit, the instructions, when executed by the at least one processing unit, causing the device to perform acts comprising:
      determining a set of association degrees associated with a set of storage disks, the set of storage disks forming a set of Redundant Arrays of Independent Disks (RAIDs), and an association degree of the set of association degrees indicating a coupling degree of a pair of storage disks in the set of storage disks, the coupling degree being determined based on a number of RAIDs associated with the pair of storage disks;

determining a first number of pairs of storage disks, wherein the coupling degree of each pair of storage disks is less than a predetermined coupling threshold; and in response to determining that a ratio of the first number to a total number of pairs of storage disks of the set of storage disks is greater than a predetermined ratio threshold, reorganizing at least one RAID in the set of RAIDs.

8. The device according to claim 7, wherein determining the first number comprises:

determining an average value of the set of association degrees; and determining the first number of association degrees from the set of association degrees, wherein a difference between each of the first number of association degrees and the average value is greater than or equal to a predetermined difference threshold.

9. The device according to claim 8, wherein the difference threshold is determined based on a standard deviation of the set of association degrees.

10. The device according to claim 7, wherein the reorganizing comprises:

moving data associated with a source storage block in the at least one RAID into a target storage block, a first storage disk corresponding to the source storage block being different from a second storage disk corresponding to the target storage block.

11. The device according to claim 10, wherein a sum of at least one association degree associated with the first storage disk is greater than a first predetermined threshold, and wherein a sum of at least one association degree associated with the second storage disk is less than a second predetermined threshold.

12. The device according to claim 7, the acts further comprising:

providing a graphical representation of the set of association degrees.

13. A computer program product being stored in a non-transitory computer storage medium and comprising machine-executable instructions which, when executed by a device, cause the device to perform acts comprising:

determining a set of association degrees associated with a set of storage disks, the set of storage disks forming a set of Redundant Arrays of Independent Disks (RAIDs), and an association degree of the set of association degrees indicating a coupling degree of a pair of storage disks in the set of storage disks, the coupling degree being determined based on a number of RAIDs associated with the pair of storage disks;

determining a first number of pairs of storage disks, wherein the coupling degree of each pair of storage disks is less than a predetermined coupling threshold; and in response to determining that a ratio of the first number to a total number of pairs of storage disks of the set of storage disks is greater than a predetermined ratio threshold, reorganizing at least one RAID in the set of RAIDs.

14. The computer program product according to claim 13, wherein determining the first number comprises:

determining an average value of the set of association degrees; and determining the first number of association degrees from the set of association degrees, wherein a difference between each of the first number of association degrees and the average value is greater than or equal to a predetermined difference threshold.

15. The computer program product according to claim 14, wherein the difference threshold is determined based on a standard deviation of the set of association degrees.

16. The computer program product according to claim 13, wherein the reorganizing comprises:

moving data associated with a source storage block in the at least one RAID into a target storage block, a first storage disk corresponding to the source storage block being different from a second storage disk corresponding to the target storage block.

17. The computer program product according to claim 16, wherein a sum of at least one association degree associated with the first storage disk is greater than a first predetermined threshold, and wherein a sum of at least one association degree associated with the second storage disk is less than a second predetermined threshold.

18. The computer program product according to claim 13, the acts further comprising:

providing a graphical representation of the set of association degrees.

* * * * *